United States Patent
Huang et al.

(10) Patent No.: US 11,286,860 B2
(45) Date of Patent: Mar. 29, 2022

(54) SEALING ASSEMBLY FOR COMPONENTS PENETRATING THROUGH CMC LINER

(71) Applicant: General Electric Company, Schenectady, NY (US)

(72) Inventors: Fei Huang, Carmel, IN (US); Daniel Kirtley, Blue Ash, OH (US); Glenn Edward Wiehe, Cincinnati, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 366 days.

(21) Appl. No.: 16/597,291

(22) Filed: Oct. 9, 2019

(65) Prior Publication Data

US 2021/0102498 A1   Apr. 8, 2021

Related U.S. Application Data

(63) Continuation-in-part of application No. 15/448,938, filed on Mar. 3, 2017, now Pat. No. 10,465,610.

(51) Int. Cl.
*F02C 7/264* (2006.01)
*F23R 3/00* (2006.01)
*F02C 7/28* (2006.01)

(52) U.S. Cl.
CPC ............ *F02C 7/264* (2013.01); *F02C 7/28* (2013.01); *F23R 3/007* (2013.01);
(Continued)

(58) Field of Classification Search
CPC .. F02C 7/28; F02C 7/264; F02C 7/266; H01T 13/00; H01T 13/08; F23R 3/007;
(Continued)

(56) References Cited

U.S. PATENT DOCUMENTS

| 3,924,403 A | 12/1975 | Irwin |
| 4,275,559 A | 6/1981 | Blair |

(Continued)

FOREIGN PATENT DOCUMENTS

| CN | 1673512 A | 9/2005 |
| CN | 202250403 U | 5/2012 |

(Continued)

OTHER PUBLICATIONS

Chinese Office Action and Search Report Corresponding to Application No. 201810174379 dated Nov. 5, 2019.

*Primary Examiner* — Ehud Gartenberg
*Assistant Examiner* — Henry Ng
(74) *Attorney, Agent, or Firm* — Venable LLP; Edward A. Kmett; Michele V. Frank

(57) ABSTRACT

Combustion sections and sealing systems for fuel ignition assemblies of gas turbine engine combustion sections are provided. For example, a sealing system comprises a ferrule positioned on an outer surface of a ceramic matrix composite (CMC) combustor liner an aperture defined in the CMC liner; a sleeve positioned within an adapter of the fuel ignition assembly such that an inner end portion of the sleeve is in contact with the ferrule, the sleeve having an end wall that forms an inner boundary of a cavity defined by the sleeve; and a biasing member positioned within the cavity. The biasing member extends between a bushing and the end wall of the sleeve. The biasing member continuously urges the sleeve into contact with the ferrule to seal the aperture against fluid leakage therethrough. The exemplary sealing system may be part of a fuel ignition assembly of a gas turbine engine combustion section.

20 Claims, 4 Drawing Sheets

(52) U.S. Cl.
CPC ...... *F05D 2220/32* (2013.01); *F05D 2240/35* (2013.01); *F05D 2240/55* (2013.01); *F05D 2260/52* (2013.01); *F05D 2260/99* (2013.01); *F05D 2300/17* (2013.01); *F05D 2300/50212* (2013.01); *F23R 2900/00012* (2013.01)

(58) Field of Classification Search
CPC ....... F23R 2900/00012; F05D 2220/32; F05D 2240/35; F05D 2240/55; F05D 2260/52; F05D 2260/99; F05D 2300/17; F05D 2300/50212
See application file for complete search history.

(56) References Cited

U.S. PATENT DOCUMENTS

| | | | |
|---|---|---|---|
| 5,402,637 A | 4/1995 | Adam | |
| 6,363,898 B1 | 4/2002 | Ripma et al. | |
| 6,438,940 B1 | 8/2002 | Vacek et al. | |
| 6,920,762 B2 | 7/2005 | Wells et al. | |
| 7,311,493 B2 | 12/2007 | Remy et al. | |
| 8,171,719 B2 | 5/2012 | Ryan | |
| 9,140,193 B2 | 9/2015 | Sutcu et al. | |
| 9,157,638 B2 | 10/2015 | Ponziani et al. | |
| 2009/0293486 A1 | 12/2009 | Hanson et al. | |
| 2013/0045452 A1 | 2/2013 | Costa et al. | |
| 2015/0233463 A1 | 8/2015 | Galivel | |
| 2016/0356233 A1 | 12/2016 | Huang et al. | |
| 2020/0080529 A1* | 3/2020 | Freer | F23R 3/30 |

FOREIGN PATENT DOCUMENTS

| | | |
|---|---|---|
| CN | 104160215 A | 11/2014 |
| CN | 102704218 A | 6/2015 |
| EP | 1443190 A1 | 8/2004 |
| EP | 2053313 A2 | 4/2009 |
| FR | 2956187 A1 | 8/2011 |

\* cited by examiner

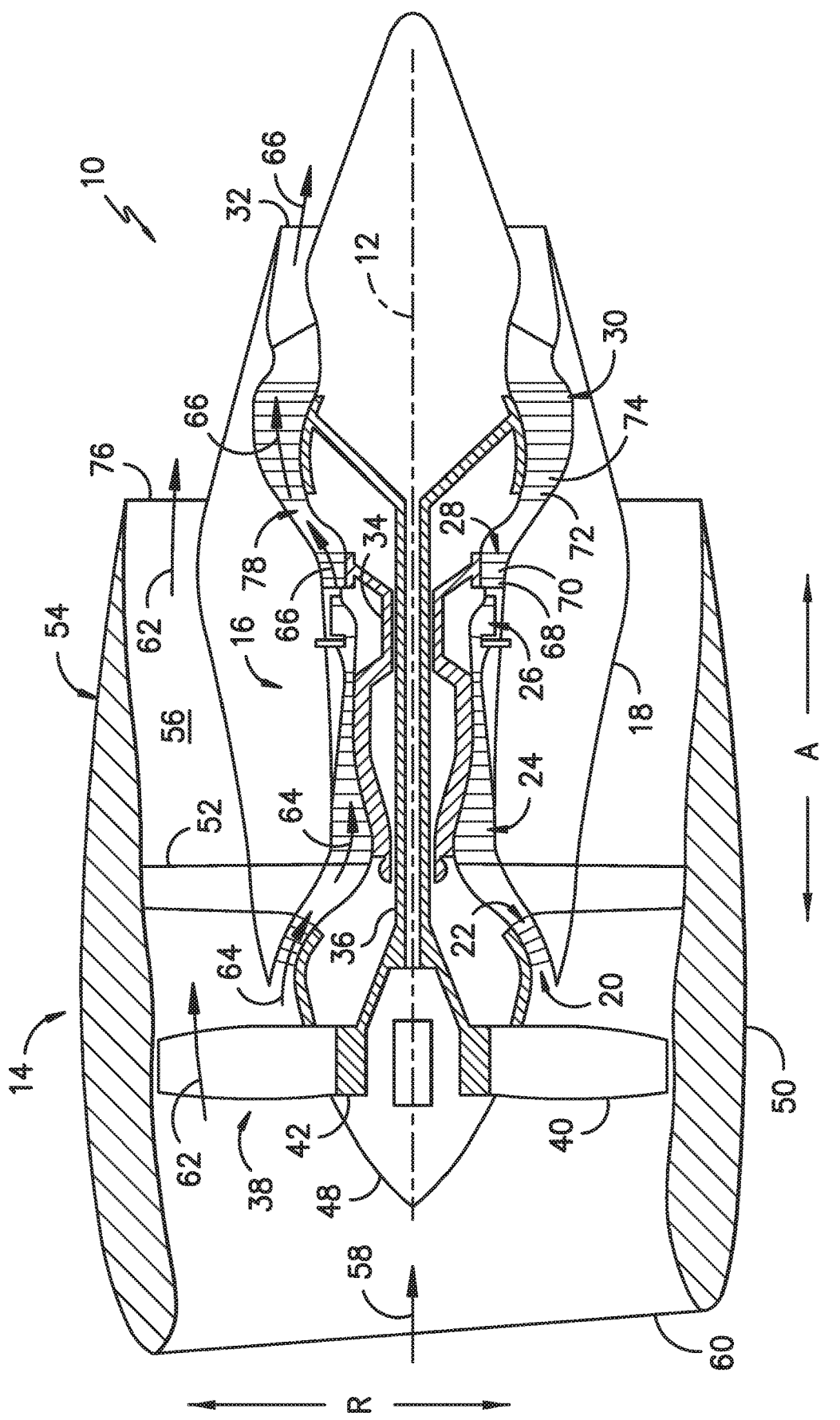
FIG. -1-

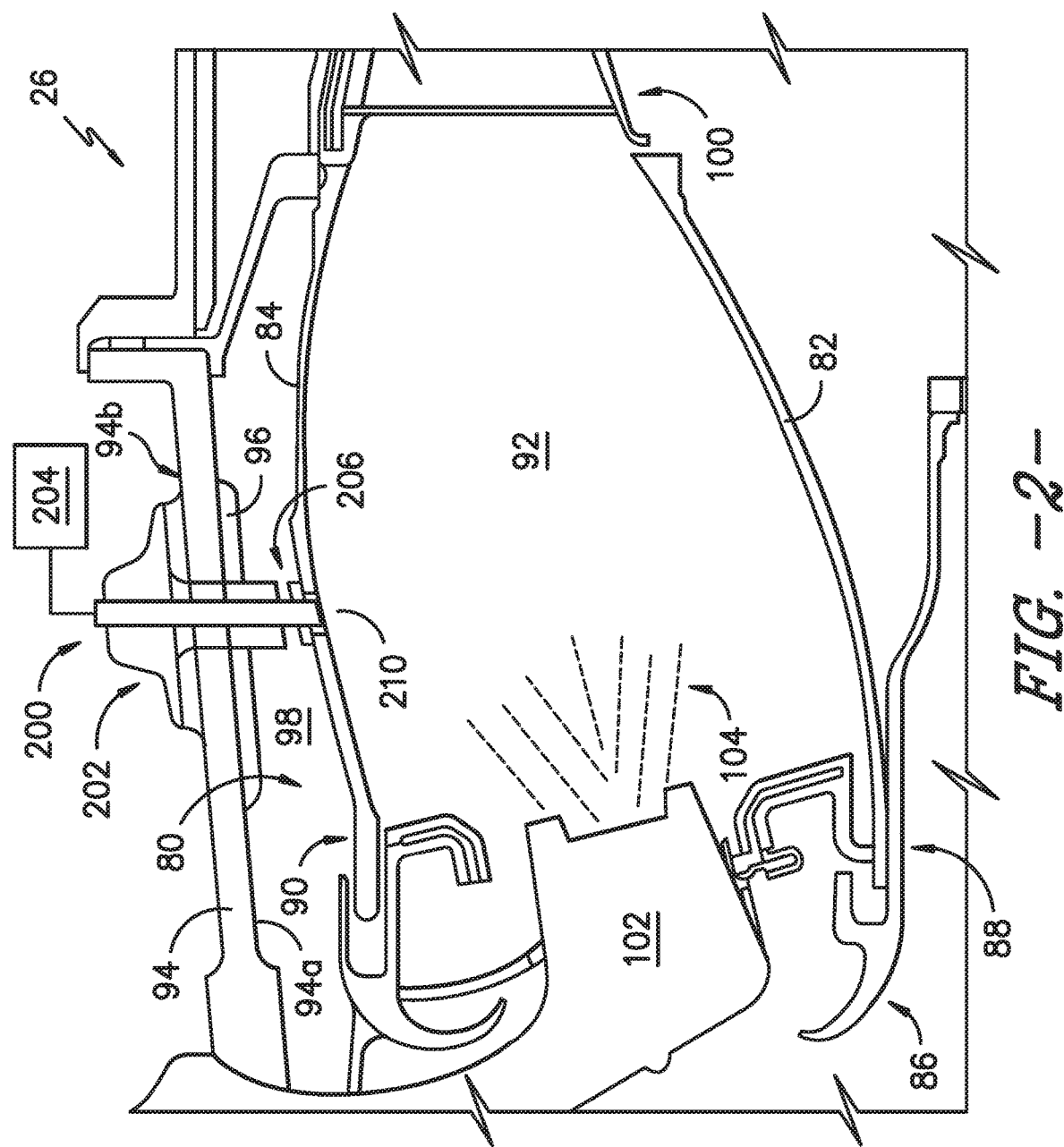
FIG. -2-

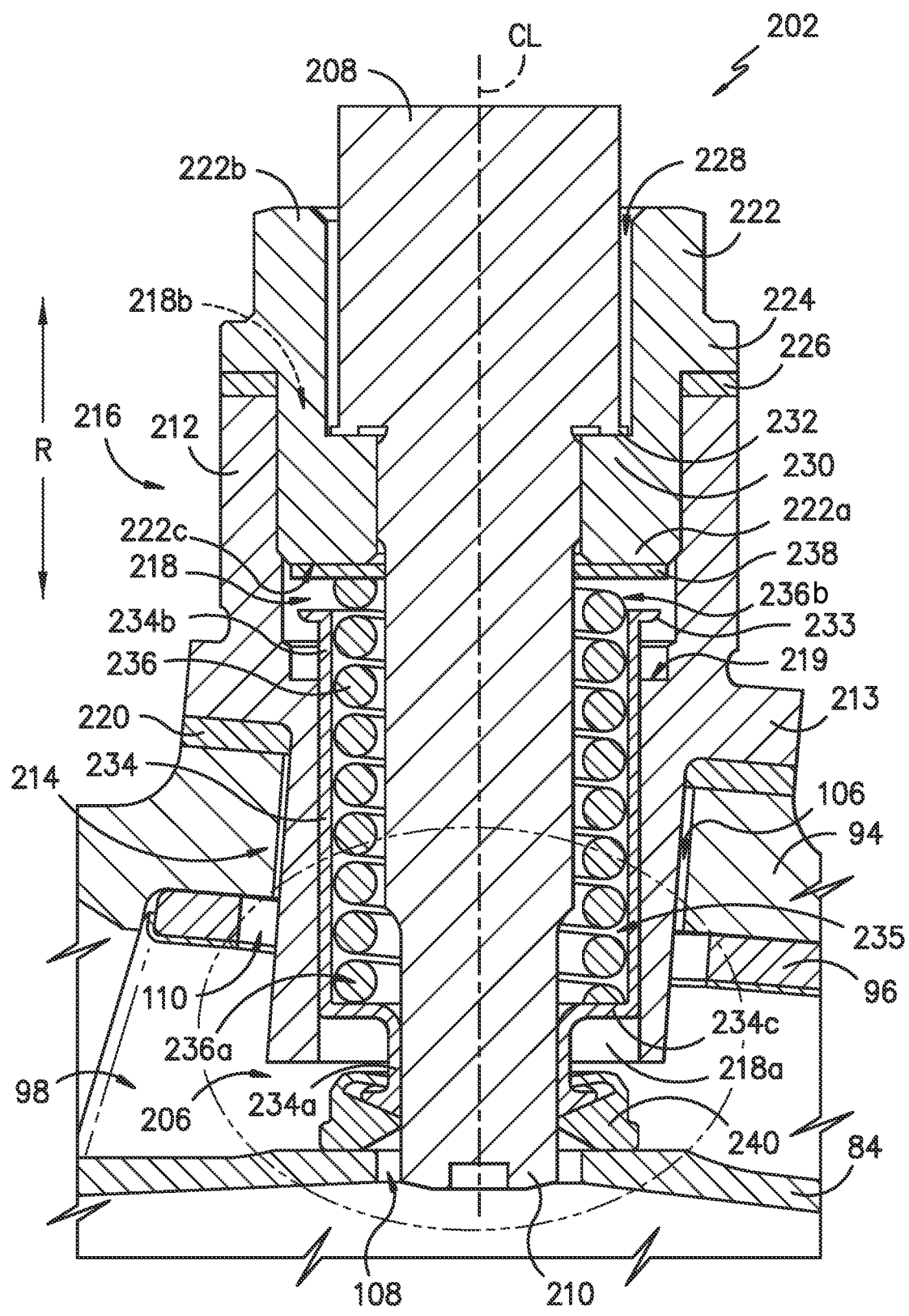
FIG. -3-

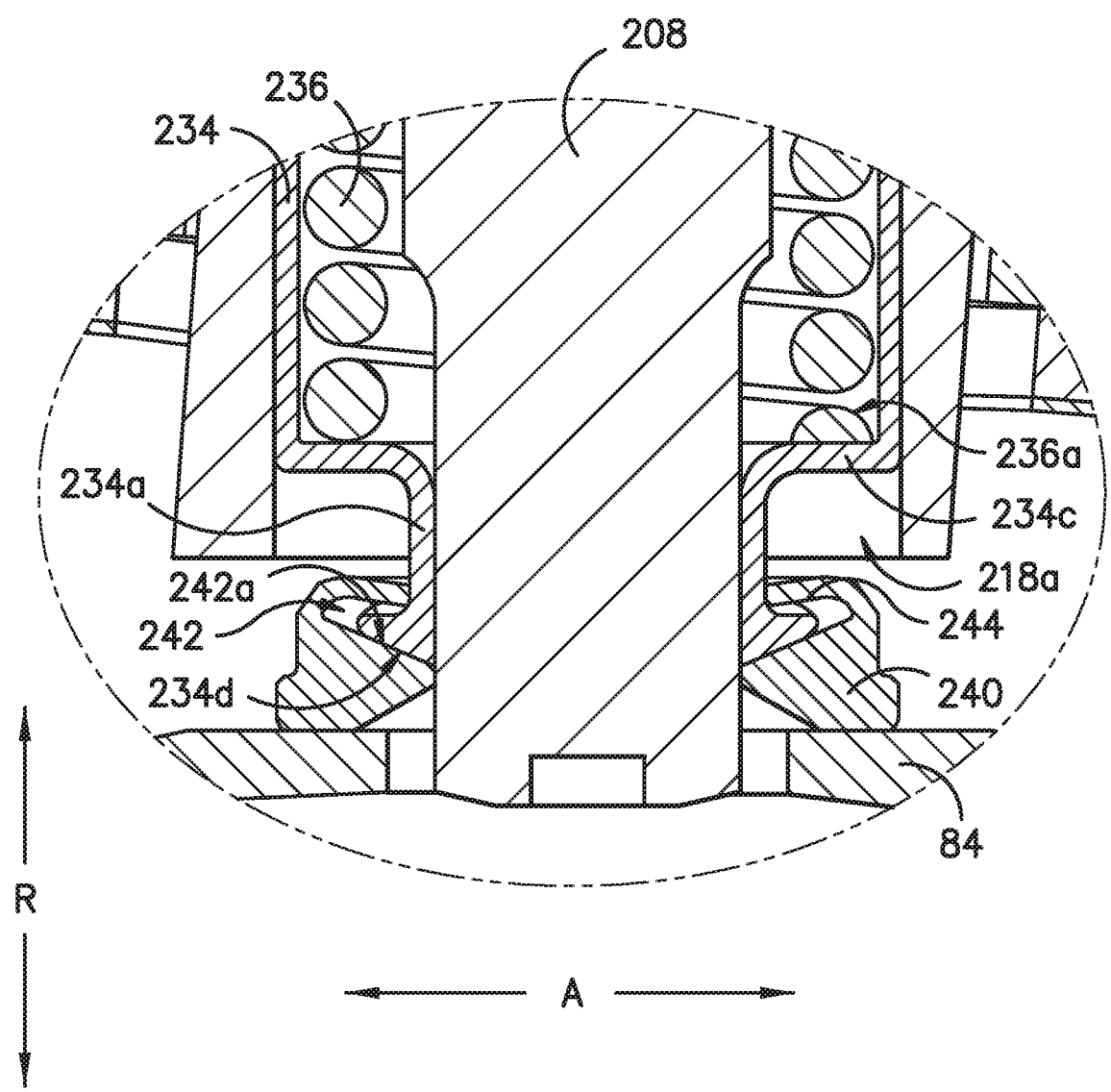
FIG. -4-

SEALING ASSEMBLY FOR COMPONENTS PENETRATING THROUGH CMC LINER

CROSS-REFERENCE TO RELATED APPLICATIONS

This application is a continuation-in-part of and claims priority to U.S. application Ser. No. 15/448,938, filed Mar. 3, 2017, the contents of which are incorporated herein by reference.

FIELD

The present subject matter relates generally to combustion assemblies of gas turbine engines. More particularly, the present subject matter relates to sealing assemblies for sealing about components penetrating through combustor liners of gas turbine engine combustion assemblies and, most particularly, through ceramic matrix composite combustor liners.

BACKGROUND

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section, which includes a combustor defining a combustion chamber. Fuel is mixed with the compressed air and burned within the combustion chamber to provide combustion gases. The combustion gases are routed from the combustion section to the turbine section. The flow of combustion gases through the turbine section drives the turbine section and is then routed through the exhaust section, e.g., to atmosphere.

The combustion section generally includes an annular inner liner, an annular outer liner radially spaced from the inner liner, and a combustor dome coupled to upstream or forward ends of the inner and outer liners. A fuel injector or nozzle extends through the dome and is configured to provide a fuel/air mixture to a combustion chamber that is defined between the inner and outer liners. An outer casing or combustor casing circumferentially surrounds the outer liner and at least partially defines an outer plenum or passage between the combustor casing and the outer liner.

The combustion section further includes an ignition system having one or more igniter assemblies mounted or coupled to the outer casing. An igniter portion of the igniter assembly extends generally radially through the outer casing and the outer plenum. An ignition tip portion of the igniter extends at least partially through an opening defined within the outer liner, and a ferrule or other seal member extends around the igniter adjacent the openings to provide a seal against fluid leakage through the opening. During operation of the gas turbine, such as during light-off or restart, the igniter may be energized to provide a spark at the ignition tip so as to ignite the fuel/air mixture within the combustion chamber.

More commonly, non-traditional high temperature materials, such as ceramic matrix composite (CMC) materials, are being used in gas turbine applications. Components fabricated from such materials have a higher temperature capability compared with typical components, e.g., metal components, which may allow improved component performance and/or increased engine temperatures. Accordingly, using a CMC material for the inner and outer liners of the combustor may improve the durability of the liners, as well as allow reduction of impingement cooling or other types of cooling of the liners and increased combustion temperatures, which may improve engine performance. However, CMC materials typically have much lower coefficients of thermal expansion than, e.g., metals or metal alloys, such that CMC components have much lower thermal growth rates than metal components.

Thus, for CMC combustor liners, radial and/or axial positioning of the igniter assembly with respect to the outer liner and/or the combustion chamber may change during operation of the gas turbine. For example, varying thermal growth rates of the outer casing and the CMC outer liner may cause shifting of the position of the seal member adjacent the liner opening, which may result in undesirable fluid leakage through the opening, e.g., from a relatively cold side of the liner to the relatively hot combustion chamber. Consequently, an improved ignition assembly for a gas turbine engine, as well as an improved sealing system for an ignition assembly, would be useful in the turbofan engine industry.

BRIEF DESCRIPTION

Aspects and advantages of the invention will be set forth in part in the following description, or may be obvious from the description, or may be learned through practice of the invention.

In one exemplary embodiment of the present subject matter, a sealing system for a fuel ignition assembly of a gas turbine engine is provided. The fuel ignition assembly comprises an igniter tube having a tip portion located proximate a combustor of the gas turbine engine. The sealing system comprises a ferrule positioned on an outer surface of a ceramic matrix composite (CMC) liner of the combustor adjacent an aperture defined in the CMC liner. The sealing system also comprises a sleeve positioned within an adapter of the fuel ignition assembly such that an inner end portion of the sleeve is in contact with the ferrule. The sleeve has an end wall that forms an inner boundary of a cavity defined by the sleeve, and the adapter supports the igniter tube. The sealing system further comprises a biasing member positioned within the cavity. The biasing member extends between a bushing and the end wall of the sleeve. The bushing is received through an outer end of an adapter opening defined by the adapter and has a shoulder that extends about an outer perimeter of the bushing and that abuts an outer end of the adapter. The biasing member continuously urges the sleeve into contact with the ferrule to seal the aperture against fluid leakage through the aperture.

In another exemplary embodiment of the present subject matter, a combustion section of a gas turbine engine is provided. The combustion section comprises an inner liner and outer liner radially spaced from the inner liner, the outer liner defining an aperture therein; a combustion chamber defined between the inner and outer liners; a combustor casing extending circumferentially around the outer liner; and a fuel ignition assembly. The outer liner and the combustor casing define an outer flow passage therebetween, and the combustor casing includes an aperture substantially aligned with the aperture of the outer liner. The fuel ignition assembly comprises an igniter tube having a tip portion received in the aperture defined in the outer liner. The fuel ignition assembly further comprises an adapter for supporting the igniter tube with respect to the combustor casing. The adapter defines an adapter opening for receipt of the igniter tube, and the adapter opening has an inner end radially opposite an outer end. The fuel ignition assembly also comprises a bushing received through the outer end of the adapter opening. The bushing has a shoulder extending about an outer perimeter of the bushing, and the shoulder abuts an outer end of the adapter. Additionally, the fuel ignition assembly comprises a ferrule positioned on an outer surface of the outer liner adjacent the aperture in the outer liner; a sleeve positioned within the adapter such that an inner end portion of the sleeve is in contact with the ferrule, the sleeve having an end wall that forms an inner boundary of a cavity defined by the sleeve; and a biasing member positioned within the cavity, the biasing member extending between the bushing and the end wall of the sleeve. The biasing member continuously urges the sleeve into contact with the ferrule to seal the aperture against fluid leakage through the aperture.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a schematic cross-section view of an exemplary gas turbine engine according to various embodiments of the present subject matter.

FIG. 2 provides a cross-section side view of a portion of a combustion section of the gas turbine engine as shown in FIG. 1 according to various embodiments of the present subject matter.

FIG. 3 is an enlarged cross-section view of a portion of the combustion section as shown in FIG. 2, including a fuel ignition assembly according to an exemplary embodiment of the present subject matter.

FIG. 4 is an enlarged cross-section view of a portion of the combustion section including a portion of the fuel ignition assembly as shown in FIG. 3, according to at least one embodiment of the present subject matter.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows and "downstream" refers to the direction to which the fluid flows.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the depicted embodiment, fan section 14 includes a fan 38 having a plurality of fan blades 40 coupled to a disk 42 in a spaced apart manner. As depicted, fan blades 40 extend outward from disk 42 generally along the radial direction R. The fan blades 40 and disk 42 are together rotatable about the longitudinal axis 12 by LP shaft 36. In some embodiments, a power gear box having a plurality of gears may be included for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters turbofan 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

In some embodiments, components of turbofan engine 10, particularly components within hot gas path 78, may comprise a ceramic matrix composite (CMC) material, which is a non-metallic material having high temperature capability. Exemplary CMC materials utilized for such components may include silicon carbide (SiC), silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as plies) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition. In other embodiments, the CMC material may be formed as, e.g., a carbon fiber cloth rather than as a tape.

More particularly, a method for forming a CMC component, such as a CMC outer liner of a combustor as described below, first may comprise laying up a plurality of plies of the CMC material to form a CMC preform having a desired shape or contour. It will be appreciated that the plurality of CMC plies forming the preform may be laid up on a layup tool, mold, mandrel, or another appropriate device for supporting the plies and/or for defining the desired shape. The desired shape of CMC preform may be a desired shape or contour of the resultant CMC component, such as the annular CMC outer liner.

After the plurality of plies is laid up to form the preform, the preform may be processed, e.g., compacted and cured in an autoclave. After processing, the preform forms a green state CMC component, e.g., a green state CMC outer liner. The green state CMC component is a single piece component, i.e., curing the plurality of plies of the preform joins the plies to produce a CMC component formed from a continuous piece of green state CMC material. The green state component then may undergo firing (or burn-off) and densification to produce a densified CMC component. For example, the green state component may be placed in a furnace to burn off any mandrel-forming materials and/or solvents used in forming the CMC plies and to decompose binders in the solvents, and then placed in a furnace with silicon to convert a ceramic matrix precursor of the plies into the ceramic material of the matrix of the CMC component. The silicon melts and infiltrates any porosity created with the matrix as a result of the decomposition of the binder during burn-off/firing; the melt infiltration of the CMC component with silicon densifies the CMC component. However, densification may be performed using any known densification technique including, but not limited to, Silcomp, melt-infiltration (MI), chemical vapor infiltration (CVI), polymer infiltration and pyrolysis (PIP), and oxide/oxide processes. In one embodiment, densification and firing may be conducted in a vacuum furnace or an inert atmosphere having an established atmosphere at temperatures above 1200° C. to allow silicon or another appropriate material or materials to melt-infiltrate into the component. Optionally, after firing and densification the CMC component may be finish machined, if and as needed, and/or coated with one or more coatings, such as an environmental barrier coating (EBC) or a thermal barrier coating (TBC).

The foregoing method of forming a CMC component, such as a CMC outer liner, is provided by way of example only. For example, other known methods or techniques for compacting and/or curing CMC plies, as well as for densifying the green state CMC component, may be utilized. Alternatively, any combinations of these or other known processes may be used.

As stated, components comprising a CMC material may be used within the hot gas path 78, such as within the combustion and/or turbine sections of engine 10. However, CMC components may be used in other sections as well, such as the compressor and/or fan sections. As a particular example described in greater detail below, an outer liner of a combustor of the combustion section 26 may be formed from a CMC material, e.g., to provide greater temperature capability of the combustor, to better protect the turbine casing from combustion gas temperatures, and/or to reduce an amount of cooling fluid supplied to the outer liner.

FIG. 2 is a cross-sectional side view of a portion of the combustion section 26. As shown in FIG. 2, the combustor section 26 generally includes an annular type combustor 80 having an annular inner liner 82, an annular outer liner 84 and a domed end 86 that extends between an upstream end 88 of the inner liner 82 and an upstream end 90 of the outer liner 84. The inner liner 82 is radially spaced from the outer liner 84 and defines a generally annular combustion chamber 92 therebetween. As previously stated, the outer liner 84 preferably is formed from a CMC material; the inner liner 82 may be formed from a CMC material as well.

The inner liner 82 and the outer liner 84 are encased within a combustor or outer casing 94, i.e., the combustor casing 94 extends circumferentially around the outer liner 84. A heat shield 96 is positioned against an inner surface 94a of the combustor casing 94, e.g., to help prevent creep in the combustor casing 94 from the temperature of the hot gases within the combustion section 26. The heat shield 96 is formed from any suitable material; in one embodiment, the heat shield 96 is formed from a high temperature metal having a honeycomb pattern formed therein. Further, an outer flow passage 98 may be defined between the combustor casing 94 and the outer liner 84. The inner liner 82 and the outer liner 84 extend from the domed end 86 toward a turbine nozzle 100. Moreover, a fuel injector or nozzle 102 extends at least partially through the domed end 86 and provides a fuel-air mixture 104 to the combustion chamber 92.

In various embodiments, as shown in FIG. 2, the combustion section 26 includes a fuel ignition system 200 for igniting the fuel-air mixture 102 within the combustion chamber 92. The fuel ignition system 200 generally includes at least one fuel igniter assembly 202 that is electrically/electronically coupled to a controller or ignition source 204. The ignition assembly 202 may be connected to an outer surface 94b of the combustor casing 94. The fuel ignition assembly 202 includes a sealing system 206 that, for example, prevents fluid from the outer flow passage 98, i.e., the cold side of the outer liner 84, from flowing into the combustion chamber 92, i.e., the hot side of the outer liner 84.

FIG. 3 provides an enlarged cross sectional view of a portion of the combustion section 26 including the fuel ignition assembly 202 as shown in FIG. 2, according to an exemplary embodiment of the present subject matter. In the exemplary embodiment shown in FIG. 3, the fuel ignition assembly 202 includes an igniter tube 208 that extends generally radially through an aperture 106 defined by the combustor casing 94. An ignition tip or tip portion 210 of the igniter tube 208 extends at least partially through an aperture 108 defined within the outer liner 84 such that the tip portion 210 is located proximate the combustor 80, as illustrated in FIG. 2. In particular embodiments, the tip portion 210 may be concentrically aligned with respect to the aperture 108 and with respect to a longitudinal centerline CL of the igniter tube 208. As shown in FIG. 3, the outer liner aperture 108 may be sized, i.e., may have a sufficient cross-sectional area, to allow some axial and/or circumferential movement of the igniter tip portion 210 within the aperture 108.

In the exemplary embodiment depicted in FIG. 3, fuel ignition assembly 202 includes an outer housing or adapter 212 that helps support the igniter tube 208, as well as the other components of fuel ignition assembly 202 positioned within the adapter 212 as further described herein, with respect to the combustor casing 94. The adapter 212 has an inner portion 214 and an outer portion 216. An opening 218 extends through the adapter 212; an inner end 218a of the opening 218 is defined in the inner portion 214, and an outer end 218b of the opening 218 is defined in the outer portion 216 such that the outer end 218b is radially opposite the inner end 218a. The opening 218 may be sized and/or shaped for receiving one or more components of the fuel ignition assembly 202 that each surround the igniter tube 208 as described in greater detail below. For instance, the opening 218 may be generally cylindrical or have any other suitable shape. As shown in FIG. 3, a portion of the igniter tube 208 may extend through and radially outwardly from the opening 218. Further, the adapter 212 extends radially through the aperture 106 in the combustor casing 94 and includes a flange 213 that supports the adapter 212 with respect to the combustor casing 94. Also, the adapter 212 may be configured to be coupled to the combustor casing 94. For example, the adapter 212 may be coupled to the combustor casing 94 at the adapter flange 213 using one or more bolts, screws, or other suitable attachment or fastening mechanisms. A seal 220 is positioned between the adapter flange 213 and the combustor casing 94 to help prevent fluid leakage through the aperture 106. It will be appreciated that the seal 220 may be a high temperature, high pressure seal suitable for use in the combustion section 26 of gas turbine engine 10. Moreover, the adapter inner portion 214 extends through an aperture 110 in the heat shield 96 and toward the outer liner 84.

Referring still to FIG. 3, the fuel ignition assembly 202 further includes a bushing 222 that supports the igniter tube 208. More particularly, an inner end 222a of the bushing 222 is received through the outer end 218b of the opening 218 in the adapter 218. The bushing 222 includes a shoulder 224 between the bushing inner end 222a and outer end 222b. The shoulder 224 extends about an outer perimeter of the bushing; the shoulder 224 rests against or abuts the outer portion 216 of the adapter 212 such that the outer end 222b of the bushing 222 extends radially outwardly from the adapter outer portion 216. As shown in FIG. 3, one or more shims 226 may be positioned between the shoulder 224 and the adapter outer portion 216, e.g., to control the radial location of igniter tip portion 210.

Similar to opening 218 through adapter 212, an opening 228 extends through the bushing 222 and may be sized and/or shaped for receiving the igniter tube 208. The opening 228 may be generally cylindrical or have any other suitable shape. A protrusion 230 extends into the opening 228 through the bushing 222, and a shoulder 232 of the igniter tube 208 rests on the protrusion 230. As such, movement of the bushing 222 that is generally parallel to the centerline CL of the igniter tube 208 also is sufficient to move the igniter tube 208. For instance, replacing the shim 226 with a thicker or thinner shim, using more than one shim 226, or removing shim 226 altogether repositions the bushing 222 with respect to the adapter 212, and thereby the combustor casing 94 and outer liner 84, which likewise repositions the igniter tube 208 with respect to the adapter 212, combustor casing 94, and outer liner 84. Thus, the position of bushing 222 is adjustable generally along the radial direction R (i.e., the bushing position is generally radially adjustable) and, therefore, helps control the location of igniter tip portion 210 by allowing generally radial adjustment of the tip portion 210.

Further, it will be understood that the igniter tube shoulder 232 may be formed as part of the igniter tube 208 or may be fixedly attached to the igniter tube 208. For example, the shoulder 232 may be formed by an outer housing, a nut, a washer, or the like that is fixedly attached to the igniter tube 208. In some embodiments, one or more shims 226, which may be of variable thickness as described herein, may be included between the igniter tube shoulder 232 and the protrusion 230 to reposition the igniter tube 208 with respect to the bushing 222 and adapter 212, which repositions the igniter tube 208 and its tip 210 with respect to the combustor casing 94 and outer liner 84. In other embodiments, the shoulder 232 may be thicker or thinner, or otherwise extend a longer or shorter distance along the centerline CL, to vary the position of igniter tube 208 with respect to the bushing 222, adapter 212, combustor casing 94, and outer liner 84. Accordingly, the position of igniter tube 208 is adjustable generally along the radial direction R (i.e., the igniter tube position is generally radially adjustable), which may help control the location of igniter tip portion 210 by allowing generally radial adjustment of the tip portion 210.

The position or location of the igniter tip portion 210 may be controlled and/or adjusted in other ways as well. For example, a thicker or thinner plate 238, which is positioned between the bushing inner surface 222c and an outer end 236b of the biasing member 236 in FIG. 3 and is discussed in greater detail below, the use of multiple plates 238 between the bushing 222 and biasing member 236, or the omission of the plate 238 may be used to radially vary the position of the igniter tube 208 and, thereby, igniter tip portion 210. In other embodiments, a thicker or thinner seal 220, the use of multiple seals 220 between the adapter 212 and the combustor casing 94, or the omission of the seal 220 may be used to vary the position of the igniter tube 208 and, thereby, igniter tip portion 210. Other radial variations in the ignition assembly 202, such as the radial location of the protrusion 230 within the bushing 222, the radial height of the adapter 212 (on which the bushing shoulder 224 rests), and/or the combination of two or more means for varying the radial position of the igniter tube 208, also may be used to control and/or adjust the position or location of the igniter tip portion 210.

Continuing with FIG. 3, a generally annular sleeve 234 is positioned within the adapter 212. More specifically, the sleeve 234 extends within the opening 218 in the adapter 212, and an inner end portion 234a of the sleeve 234 extends through the inner end 218a of opening 218 and toward the outer liner 84. An outer end portion 234b of the sleeve 234 is positioned adjacent the bushing inner end 222a within the adapter opening 218. As shown in FIG. 3, the sleeve 234 is free to move along the adapter opening 218, but the adapter 212 may define a lip or radial stop 219 to limit radially inward movement of the sleeve 234. That is, the sleeve 234 defines a collar 233 about its outer end portion 234b that catches on or abuts the radial stop 219 when the sleeve 234 is at a maximum radially inward position. The radial stop 219 may be defined within the sleeve 234 such that the radial stop is radially outward from or above the combustor casing 94 when the adapter 212 is assembled with the combustor casing.

A biasing member 236, such as a spring or the like, is positioned within the sleeve 234 and extends circumferentially around a portion of the igniter tube 208. The biasing member 236 is disposed between an end wall 234c of the sleeve 234 and an inner surface 222c of the bushing 222. The end wall 234c forms an inner boundary of a cavity 235 defined by the sleeve 234, and the biasing member 236 is positioned within the cavity 235 such that the biasing member 236 extends between the end wall 234c and the bushing 222. In one embodiment, the biasing member 236 may be a coil spring, and in another embodiment, the biasing member 236 may be a wave spring. The sleeve 234 surrounding the biasing member 236 helps prevent binding or buckling of the biasing member 236, e.g., under operating conditions of the engine 10.

Further, in some embodiments, a plate 238 extends between the bushing inner surface 222c and an outer end 236b of the biasing member 236 such that the biasing member 236 contacts the plate 238 rather than the inner surface 222c of bushing 222. Thus, the plate 238 protects the bushing 222 from wear that would otherwise occur due to the biasing member contact. It will be appreciated that the plate 238 preferably has a sufficient cross-sectional area to prevent any portion of the biasing member 236 from contacting the bushing 222. Moreover, in addition to controlling the location of igniter tip portion 210, the one or more shims 226 may be used to control the working height or length of the biasing member 236, which may affect the load provided by the biasing member against the end wall 234c.

An inner end 236a of the biasing member 236 contacts the end wall 234c of the sleeve 234 such that, the biasing member 236 generally provides a radially inward force against the sleeve 234, i.e., end wall 234c, so as to bias or continuously urge the sleeve inner end portion 234a against a ferrule 240 positioned adjacent the outer liner aperture 108 and thereby seat the inner end portion 234a with respect to the ferrule 240. As described in greater detail below, the ferrule 240 provides a seal around the igniter tube 208 and the outer liner aperture 108 to, for example, prevent leakage of fluid from the outer flow passage 98 into the hot gas path 78, i.e., from the cold side to the hot side of outer liner 84. By biasing or urging the sleeve 234 against the ferrule 240, the biasing member 236 helps to maintain the seal provided by the ferrule despite relative axial and circumferential movement between the ferrule 240 and the outer liner 84, as well as relative radial movement between the outer liner 84 and combustor casing 94.

FIG. 4 is an enlarged cross sectional view of a portion of the combustion section 26 as shown in FIG. 3 and includes, at least in part, a portion of the outer liner 64, the tip portion 210 of the igniter tube 208, the inner end portion 234a of the sleeve 234, and the ferrule 240. In the exemplary embodiment depicted in FIG. 4, the ferrule 240 is generally concentrically aligned with the opening 108 in outer liner 84, but as described above, the ferrule 240 may move axially and/or circumferentially with respect to the opening 108. For instance, the ferrule 240 and/or the outer liner 84 may move axially and/or circumferentially with respect to the other of the ferrule and outer liner during operation of the gas turbine engine 10. The ferrule 240 may have a shape and/or size suitable to ensure a collar 240a of the ferrule 240, which extends about the ferrule 240, remains surrounding the opening 108 despite any relative axial and/or circumferential movement between the ferrule 240 and the outer liner 84.

As further illustrated in FIG. 4, the ferrule 240 defines a pocket 242, and the inner end portion 234a of the sleeve 234 is formed and/or shaped to mount within the pocket 242. The ferrule 240 may include a lip 244 or other like feature or device for locking or retaining the sleeve inner end portion 234a within the pocket 242. For example, in other embodiments, the ferrule 240 may define one or more tabs 244 for retaining the sleeve inner end portion 234a within the pocket 242. In particular embodiments, at least a portion of an outer surface 234d of the sleeve inner end portion 234a may be shaped or formed complementary to an inner surface 242a of the pocket 242. For example, in one embodiment, a portion of the sleeve outer surface 234d and a portion of the pocket inner surface 242a may be spherical and/or arcuate to form a ball and socket type joint therebetween, thus allowing for relative movement between the outer liner 84 and the ferrule 240, as well as between the outer liner 84 and combustor casing 94, during operation of the gas turbine engine 10. That is, during engine operation, the outer liner 84 may move radially and/or axially with respect to the combustor casing 94; such relative movement may be caused by a number of factors including varying thermal growth rates between the outer liner 84 and the combustor casing 94 and/or g-forces on the gas turbine engine 10 such as during take-off, landing, or general maneuvering of an aircraft to which the engine 10 is attached. Further, the ferrule 240 may move axially and/or circumferentially with respect to the outer liner 84, e.g., due to combustion dynamics, as well as the foregoing reasons for relative movement between the outer liner 84 and combustor casing 94. By locking or retaining the sleeve inner end portion 234a in the ferrule pocket 242, contact between the sleeve 234 and ferrule 240 may be maintained because the sleeve 234 will travel radially, axially, and/or circumferentially with the ferrule 240 as it moves with respect to the outer liner 84 and as the outer liner 84 moves with respect to the combustor casing 94. As a result, the seal between the ferrule 240 and the igniter tube 208 and outer liner aperture 108 may be maintained so as to prevent fluid leakage between the ferrule 240 and igniter tube 208 and between the ferrule 240 and aperture 108.

Moreover, the sleeve 234 transfers a generally uniform load from the biasing member 236 to the ferrule 240, e.g., the biasing member 236 presses against the sleeve end wall 234c, which in turn transfers the load from the biasing member 236 to the sleeve inner end portion 234a, and thereby to the ferrule 240, in a generally uniform manner. As such, the biasing member 236 helps ensure generally uniform contact between the sleeve 234 and the ferrule 240, which helps ensure a good seal between the ferrule 240 and the outer liner 84, as well as the ferrule 240 and the igniter tube 208. Further, the biasing member 236 is sized and/or selected to provide an adequate load to the ferrule 240, via sleeve 234, at any engine cycle temperature or combustion dynamics condition. More particularly, the biasing member 236 may be exposed to relatively high temperatures, e.g., in excess of approximately 1300° F., during operation of the engine 10. Thus, an appropriate biasing member 236 must be selected to apply a sufficient load to the ferrule 240 over a range of temperatures including such relatively high temperatures. Additionally, the combustion dynamics of engine 10 may include vibrations within the combustor 80, which may cause the outer liner 84 to vibrate as well. As such, an appropriate biasing member 236 must be selected to apply a sufficient load to the ferrule 240 to keep the ferrule in contact with the outer liner 84 even as the outer liner 84 vibrates or moves. Moreover, each of the sleeve 234 and ferrule 240 preferably are light weight components, e.g., formed from lightweight materials or formed as trimly as possible, to help reduce the moving member dynamics load. Light weight components may be, for example, those that maintain the combustor dynamics within an acceptable range and, thus, do not push the combustor dynamics outside of the acceptable range.

Further, as previously described, in particular embodiments the outer liner 84 is formed from a CMC material and, thus, may be referred to as CMC outer liner 84. However, the combustor casing 94 may be formed from a different material, such as a metal or metal alloy. Accordingly, the CMC outer liner 84 and the combustor casing 94 may have different coefficients of thermal expansion or different thermal growth rates, and in embodiments in which the combustor casing 94 is formed from a metal or metal alloy material, the combustor casing 94 may thermally expand faster than, or at a greater rate than, the CMC outer liner 84. As a result of the differing thermal growth rates, the combustor casing 94 may move radially with respect to the outer liner 84.

As discussed above and illustrated in FIG. 3, the combustor casing 94 supports the adapter 212, in which the sleeve 234 and biasing member 236 are received and which supports the igniter tube 208 and busing 222. As such, radial movement of the combustor casing 94 causes radial movement of the adapter 212 and, thus, radial movement of the igniter tube 208 and bushing 222. Therefore, the biasing member 236 also must supply a sufficient load to maintain the inner end portion 234a of sleeve 234 in contact with the ferrule 240 despite any radial movement of the adapter 212, igniter tube 208, and bushing 222 and thereby preserve the seal between the ferrule 240, the outer liner 84, and the igniter tube 208.

The embodiments as described herein and as illustrated in FIGS. 3 and 4 provide various improvements and/or technical benefits over known or existing spark ignition systems, as well as sealing features for such systems. For example, the biasing member 236 keeps the inner end portion 234a of the sleeve 234 in contact with the ferrule 240 as the outer liner 84 moves with respect to the combustor casing 94 and as the ferrule 240 moves with respect to the outer liner 84, i.e., across various static and dynamic loads and in spite of differing thermal growth rates between components. Maintaining a proper seal between the cold side and the hot side of the outer liner 84 can, e.g., improve engine performance or the like.

In addition or in the alternative, the sleeve 234 helps prevent binding or buckling of the biasing member 236 due to relatively high temperatures and/or due to radial and/or axial growth differences between the CMC outer liner 84 and the combustor casing 94. Additionally or alternatively, the use of one or more shims 226 minimizes tolerance stack-up issues for the biasing member 236 and sleeve 234, as well as helps eliminate binding concerns with respect to the biasing member 236. Other improvements and/or technical benefits also may be realized from the embodiments described herein.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A sealing system for a fuel ignition assembly of a gas turbine engine, the fuel ignition assembly comprising an igniter tube having a tip portion located proximate a combustor of the gas turbine engine, the sealing system comprising:
   a ferrule positioned on an outer surface of a ceramic matrix composite (CMC) liner of the combustor, the ferrule located adjacent an aperture defined in the CMC liner;
   an adapter housing supporting the igniter tube, the adapter housing defining an adapter inner end and an adapter outer end radially outward thereof, and an adapter opening therethrough;
   a bushing having a bushing shoulder extending about an outer perimeter of the bushing, the bushing shoulder abutting the adapter outer end of the adapter housing, the bushing defining an opening therethrough and including a protrusion extending inward into the opening, the bushing received into the adapter opening through the adapter outer end;
   a sleeve positioned within the adapter opening such that an inner end portion of the sleeve is in contact with the ferrule, the sleeve having an end wall that forms an inner boundary of a cavity defined by the sleeve; and
   a biasing member positioned within the cavity, the biasing member extending between an inner surface of the bushing and the end wall of the sleeve, wherein the igniter tube includes an igniter tube shoulder, the igniter tube positioned in the opening of the bushing and the igniter tube shoulder abutting the protrusion, and wherein the biasing member continuously urges the sleeve into contact with the ferrule to seal the aperture against fluid leakage through the aperture.

2. The sealing system of claim 1, wherein at least one shim is positioned between the igniter tube shoulder and the protrusion of the bushing.

3. The sealing system of claim 1, wherein the igniter tube shoulder and the protrusion of the bushing are each defined at a radial position to control a location of the tip portion of the igniter tube with respect to the CMC liner of the combustor.

4. The sealing system of claim 1, wherein at least one shim is positioned between the bushing shoulder and the adapter outer end of the adapter housing.

5. The sealing system of claim 1, wherein a plate extends between the inner surface of the bushing and an outer end of the biasing member.

6. The sealing system of claim 1, wherein the adapter housing defines a radial stop that limits radial movement of the sleeve within the adapter housing.

7. The sealing system of claim 6, wherein the sleeve defines a collar about an outer end portion of the sleeve, and wherein the collar abuts the radial stop when the sleeve is at a maximum radially inward position.

8. The sealing system of claim 1, wherein the adapter housing defines a flange to support the adapter housing with respect to a combustor casing, and wherein a seal extends between the combustor casing and the flange.

9. The sealing system of claim 8, wherein the combustor casing is formed from a metal or a metal alloy such that the combustor casing and the CMC liner have different coefficients of thermal expansion.

10. The sealing system of claim 1, wherein at least a portion of an outer surface of the inner end portion of the sleeve is spherical or arcuate.

11. The sealing system of claim 10, wherein the ferrule defines a pocket in which the inner end portion of the sleeve is received, and wherein an inner surface of the pocket is shaped complementary to the outer surface of the inner end portion of the sleeve.

12. The sealing system of claim 1, wherein the biasing member is a coiled spring.

13. A combustion section of a gas turbine engine, comprising:

an inner liner and an outer liner radially spaced from the inner liner, the outer liner defining an aperture therein;

a combustion chamber defined between the inner liner and the outer liner;

a combustor casing extending circumferentially around the outer liner, the outer liner and the combustor casing defining an outer flow passage therebetween, the combustor casing including an aperture substantially aligned with the aperture of the outer liner; and a fuel ignition assembly comprising:

an igniter tube having an igniter tube shoulder and a tip portion received in the aperture defined in the outer liner;

an adapter housing for supporting the igniter tube with respect to the combustor casing, the adapter housing defining an adapter inner end and an adapter outer end radially outward thereof, and an adapter opening therethrough for receipt of the igniter tube;

a bushing received into the adapter opening through the adapter outer end, the bushing having a bushing shoulder extending about an outer perimeter of the bushing, the bushing shoulder abutting the adapter outer end of the adapter housing;

a ferrule positioned on an outer surface of the outer liner adjacent the aperture in the outer liner;

a sleeve positioned within the adapter housing such that an inner end portion of the sleeve is in contact with the ferrule, the sleeve having an end wall that forms an inner boundary of a cavity defined by the sleeve; and a biasing member positioned within the cavity, the biasing member extending between an inner surface of the bushing and the end wall of the sleeve, wherein a position of the igniter tube shoulder is radially adjustable to control a location of the tip portion with respect to the aperture defined in the outer liner, and wherein the biasing member continuously urges the sleeve into contact with the ferrule to seal the aperture of the outer liner against fluid leakage through the aperture of the outer liner.

14. The combustion section of claim 13, wherein the bushing defines an opening therethrough and includes a protrusion extending inward into the opening, and wherein the igniter tube shoulder abuts the protrusion.

15. The combustion section of claim 14, wherein at least one shim is positioned between the igniter tube shoulder and the protrusion of the bushing.

16. The combustion section of claim 13, wherein at least one shim is positioned between the shoulder of the bushing and the adapter outer end of the adapter housing.

17. The combustion section of claim 13, wherein a plate extends between the inner surface of the bushing and an outer end of the biasing member.

18. The combustion section of claim 13, further comprising a heat shield positioned between the outer liner and the combustor casing.

19. The combustion section of claim 13, wherein at least the outer liner is formed from a ceramic matrix composite material.

20. The combustion section of claim 13, wherein at least a portion of an outer surface of the inner end portion of the sleeve is spherical or arcuate, wherein the ferrule defines a pocket in which the inner end portion of the sleeve is received, and wherein an inner surface of the pocket is shaped complementary to the outer surface of the inner end portion of the sleeve.

* * * * *